(12) United States Patent
Yanagawa et al.

(10) Patent No.: US 6,634,878 B1
(45) Date of Patent: Oct. 21, 2003

(54) CROSSHEAD

(75) Inventors: Naoki Yanagawa, Shizuoka (JP); Atsushi Kaneko, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 462 days.

(21) Appl. No.: 09/657,809

(22) Filed: Sep. 8, 2000

(30) Foreign Application Priority Data

Sep. 28, 1999 (JP) ............................................ 11-274689

(51) Int. Cl.⁷ ................................................. B29C 47/04
(52) U.S. Cl. .................... 425/113; 425/131.1; 425/132; 425/133.1; 425/192 R; 425/215; 425/382.4; 425/462
(58) Field of Search ................................. 425/113, 114, 425/132, 133.1, 215, 217, 382.4, 462, 192 R, 131.1

(56) References Cited

U.S. PATENT DOCUMENTS 4,248,824 A  *  2/1981  Hattop .................. 264/173.18
4,548,567 A  * 10/1985  Missout ..................... 425/113
4,998,870 A  *  3/1991  Seibert ....................... 425/113
5,108,683 A  *  4/1992  Anand .................... 264/171.17
5,773,037 A  *  6/1998  Geider et al. ............... 425/132

FOREIGN PATENT DOCUMENTS

| JP | 4-59219 | 2/1992 |
| JP | 7-21858 | 1/1995 |
| JP | 10-95037 | 4/1998 |

* cited by examiner

Primary Examiner—James P. Mackey
Assistant Examiner—Joseph Leyson
(74) Attorney, Agent, or Firm—Morgan, Lewis & Bockius LLP

(57) ABSTRACT

A ground color main extruder 9 which supplies a ground color resin that is to cover a strand conductor 3 is disposed. Plural stripe sub extruders 21 and 31 which supply a colored resin in a strip-like manner in a longitudinal direction of the strand conductor 3 simultaneously with extrusion of the ground color resin are disposed. Insert molds 16 and 17 are multiply disposed. While alternatingly switching over the stripe sub extruders 21 and 31 each time when a colored resin to be supplied is changed, a colored resin of a predetermined color is supplied through a path which is disposed for each of the stripe sub extruders 21 and 31.

16 Claims, 6 Drawing Sheets

PRIOR ART

CROSSHEAD

BACKGROUND OF INVENTION

1. Field of Invention

The present invention relates to a crosshead for producing a stripe electric wire in which, when a conductor is covered with a synthetic resin of the ground color in a wire cover extrusion line, colored resins of a color different from the ground color are supplied in a stripe manner from stripe sub extruders, and more particularly to a crosshead in which a mixed color area (color change loss) that is produced when the color of a colored resin covering in a stripe manner, or that of a skin layer colored resin is changed can be reduced.

2. Related Art

Usually, an electric wire has a structure in which the outside of a conductor is covered with an insulator of a synthetic resin. In order to prevent erroneous connection from occurring, such an electric wire is configured as a stripe electric wire in which the insulator is covered in a strip-like manner with a resin of a color different from the ground color so as to identify the wire. In such a stripe electric wire, the stripe coloring on the insulator is performed by using a stripe sub extruder 13, a covering resin supplied from a ground color main extruder 9 is used as a ground color resin, and the covering resin is covered with a colored covering resin in a stripe manner.

Conventionally, the stripe electric wire is produced by using a crosshead such as shown in FIG. 7.

The crosshead body 2 of the crosshead 1 is formed into a cylindrical shape. A cylindrical nipple 4 in which the tip end is tapered and a strand conductor 3 runs through the center is fitted into the crosshead body 2 so as to maintain a predetermined gap between the nipple and the inner face of the crosshead body 2. An insert mold 5 which is formed into a cylindrical shape is fittingly attached to the tip end portion of the crosshead body 2. A hole through which a covered wire 6 in which the strand conductor 3 is covered with a resin is to run is formed in the center of the insert mold 5. A die 7 which is tapered toward the center is fixedly attached to the mold. The die 7 and the nipple 4 are placed at the same center.

A ground color resin supply path 8 is opened in the crosshead body 2. A ground color main extruder 9 is attached to the body so as to communicate with the ground color resin supply path 8. A ground color resin is supplied from the ground color main extruder 9 into the crosshead body 2 via the ground color resin supply path 8. The reference numeral 10 denotes a seal for attaching the ground color main extruder 9 to the crosshead body 2, and 11 denotes a switch cock for, when the color of the ground color resin from the ground color main extruder 9 is to be changed, stopping the supply of the resin therefrom.

A stripe resin supply path 12 is opened in the crosshead body 2. A stripe sub extruder 13 is attached to the body so as to communicate with the stripe resin supply path 12. A colored resin for a stripe is supplied from the stripe sub extruder 13 into the crosshead body 2 via the stripe resin supply path 12.

The reference numeral 14 denotes a seal for attaching the stripe sub extruder 13 to the crosshead body 2, and 15 denotes a switch cock for, when the color of the colored resin from the stripe sub extruder 13 is to be changed, stopping the supply of the resin therefrom.

The switch cock 15 is used for stopping the supply of the stripe covering resin to the crosshead body 2, and discharging a part of the stripe covering resin of a new color which is continuous to that of the old color that has been used before the color change. In the switch cock 15, in order to smoothly supply the colored resin to the crosshead body 2, a heater is internally disposed to heat the colored resin to an appropriate temperature.

The switching by means of the switch cock 15 is performed in the following manner. The supply route from the stripe sub extruder 13 to the crosshead body 2 is changed to a discharge route from the stripe sub extruder 13 to the outside by an adequate method. In the case where the switching of the switch cock 15 is to be conducted, before the switching of the switch cock 15, the production line is stopped, and a hopper storing a coloring material is switched to another one so that the colored stripe covering resin to be supplied to the stripe sub extruder 13 is replaced with a resin of another color. Thereafter, the switch cock 15 is switched over from the supply route from the stripe sub extruder 13 to the crosshead body 2, to the discharge route from the stripe sub extruder 13 to the outside. As a result of the switching of the switch cock 15, the stripe colored resin which has been extruded by the stripe sub extruder 13 is discharged through a discharge port of the switch cock 15.

A stripe electric wire is produced by using the thus configured crosshead 1 in the following manner. The ground color resin supplied from the ground color main extruder 9 is sent via the ground color resin supply path 8 to the tip end of the nipple 4 with passing through the gap between the inner peripheral face of the crosshead body 2 and the outer peripheral face of the nipple 4. The surface of the strand conductor 3 is covered with the resin at a predetermined thickness by means of the tapered tip end portion of the crosshead body 2 and the tapered portion of the die 7. When the surface of the strand conductor 3 is to be covered with the resin at the predetermined thickness, the stripe colored resin is extruded from the stripe sub extruder 13 with passing through the stripe resin supply path 12, into the ground color resin passing through the gap between the inner peripheral face of the crosshead body 2 and the outer peripheral face of the nipple 4, so as to be longitudinally added in a stripe manner. The colored resin is then sent together with the ground color resin, and the surface of the strand conductor 3 is covered with the colored resin in a stripe manner by means of the tapered tip end portion of the crosshead body 2 and the tapered portion of the die 7.

In the production of a stripe electric wire by using the crosshead 1, the color of the stripe is sometimes changed although the ground color resin is not changed. In this case, the ground color resin is continued to be supplied from the ground color main extruder 9. In the stripe sub extruder 13, by contrast, the running of the strand conductor 3 is temporarily stopped, the supply of the colored resin from the stripe sub extruder 13 to the crosshead body 2 is temporarily stopped, and the color of the colored resin in the stripe sub extruder 13 is changed. When the color change of the colored resin in the stripe sub extruder 13 is performed, the covering resin of the old color which is used before the color change is discharged through the discharge port (not shown) of the switch cock 15. When the discharge of the covering resin of the new color is checked and it is judged that the output of the covering resin of the new color is completely attained, the switch cock 15 is returned to the resin supplying position to restart the extrusion covering on the strand conductor 3. When the new colored resin is supplied from the thus configured stripe sub extruder 13, the colored resin of the old color remains in the stripe resin supply path 12 or the like, and hence the colored resin of the old color is initially supplied, and the colored resin for forming a stripe which is supplied as a result of the color changing is then extruded in succession and continuously with the colored resin of the old color. The colored resin of the old color is mixed with that of the new color, and then replaced with that of the new color.

The resin which is initially discharged from the discharge port of the switch cock 15 is the colored resin of the old color which is used before the color change, and after a short time a resin in which the stripe covering resin of the old color is mixed with that of the new color is discharged. After a further short time elapses, only the stripe covering resin of the new color is discharged. At the timing when the discharge of only the stripe colored resin of the new color is checked, the switch cock 15 is switched over to change the discharge route from the stripe sub extruder 13 to the outside, to the supply route from the stripe sub extruder 13 to the crosshead body 2. As a result of the switching of the switch cock 15, the stripe colored resin of the new color is supplied to the crosshead body 2. At the same time when the switch cock 15 is switched over, the production line is restarted. In this way, the switching from the stripe covering resin of the old color to that of the new color is performed.

However, the conventional crosshead has the following problems. In the case where the color of the stripe colored resin with which the surface of the strand conductor 3 is covered is to be changed, the hopper storing a coloring material is switched to another one to change the colored resin, the covering resin of the old color which has been used before the color change and which remains in the stripe sub extruder is then discharged, and it is checked that the covering resin of the new color is discharged. Therefore, the changing operation requires much labor, and, when the switching by means of the switch cock is delayed, the covering resin is lost in a larger amount. Particularly, the resin of the old color remains in the range "from the switch cock to the insert mold," and a mixed color area is produced in a subsequent extrusion of the resin of the next color, with the result that a color change loss is caused.

SUMMARY OF INVENTION

It is an object of the invention to prevent a mixed color area from being produced in a process of changing from the old color to the next color, thereby eliminating a color change loss (color failure of an electric wire).

In order to attain the object, the crosshead of a first aspect of the invention is configured so that a ground color main extruder which supplies a ground color resin that is to cover a strand conductor is disposed, plural stripe sub extruders which supply a colored resin in a strip-like manner in a longitudinal direction of the strand conductor simultaneously with extrusion of the ground color resin are disposed, insert molds are multiply disposed, and, while alternatingly switching over the stripe sub extruders each time when a colored resin to be supplied is changed, a colored resin of a predetermined color is supplied through a path which is disposed for each of the stripe sub extruders.

According to the first aspect of the invention configured as described above, production of a mixed color area in a process of changing from the old color to the next color can be largely reduced, and a color change loss (color failure of an electric wire) can be greatly decreased.

In order to attain the object, the crosshead of a second aspect of the invention is configured so that stripes are formed are formed by pairing symmetrical positions on an outer periphery of a covered wire, and separating the positions by a predetermined angle for each of the stripe sub extruders.

According to the second aspect of the invention configured as described above, the resin pressure in the crosshead can be uniformalized, and a stripe electric wire in which the stripe is positioned in balance can be produced.

In order to attain the object, the crosshead of a third aspect of the invention is configured so that one or plural skin layer sub extruders which form a skin layer on a covered wire covered with an inner layer resin by the ground color main extruder are attached to the crosshead, and a skin layer insert mold for forming the skin layer is singly or multiply disposed.

According to the third aspect of the invention configured as described above, an inner layer resin can be thinly covered with a resin of a preferred color so that the ground color of the covered electric wire can be freely changed without being affected by the color of the inner layer resin.

In order to attain the object, the crosshead of a fourth aspect of the invention is configured so that, in middles of supply paths through which the colored resins of the stripe sub extruders are supplied to the insert molds, switch cocks which allow and stop the supplies of the colored resins from the stripe sub extruders to the insert molds are respectively disposed, and resin discharge paths which respectively elongate from positions where the switch cocks are attached, and which are opened to an outside are disposed.

According to the fourth aspect of the invention configured as described above, during an operation of changing the color of the stripe colored resin, it is possible to prevent a mixed color area from being produced in a process of changing from the old color to the next color, whereby a color change loss (color failure of an electric wire) can be prevented from occurring.

In order to attain the object, the crosshead of a fifth aspect of the invention is configured so that, in middles of supply paths through which colored resins of the skin layer sub extruders are supplied to the skin layer insert molds, switch cocks which allow and stop the supplies of the colored resins from the skin layer sub extruders to the skin layer insert molds are respectively disposed, and resin discharge paths which respectively elongate from positions where the switch cocks are attached, and which are opened to an outside are disposed.

According to the fifth aspect of the invention configured as described above, during an operation of changing the color of the colored resin for the skin layer, the colored resin of the old color which remains in the range from the skin layer sub extruder to the switch cock can be surely discharged to the outside, and hence it is possible to prevent a mixed color area from being produced in a process of changing from the old color to the next color, whereby a color change loss (color failure of an electric wire) can be prevented from occurring.

In order to attain the object, the crosshead of a sixth aspect of the invention is configured so that each of the switch cock is a cock which is formed into a columnar shape, and in which a resin path that radiately communicates with a center is formed, and a discharge path elongates from a position where the resin path is formed, toward a center axis and so as not to communicate with the resin path, and is opened in an end portion.

According to the sixth aspect of the invention configured as described above, during an operation of changing the color of the stripe colored resin or that of changing the color of the colored resin for the skin layer, it is possible to prevent a mixed color area from being produced in a process of changing from the old color to the next color, whereby a color change loss (color failure of an electric wire) can be prevented from occurring.

In order to attain the object, the crosshead of a seventh aspect of the invention is configured so that, when the colored resins are to be supplied from the stripe sub extruders to the insert molds, the switch cocks cause sub-extruder supply paths through which the colored resins from the stripe sub extruders are supplied, to communicate with insert mold supply paths through which the colored resins are supplied to the insert molds, and, when the supplies of the colored resins from the stripe sub extruders are to be stopped, cause the sub-extruder supply paths through which the colored resins from the stripe sub extruders are supplied, to communicate with the resin discharge paths, and the insert mold supply paths to communicate with the discharge paths.

According to the seventh aspect of the invention configured as described above, during an operation of changing the color of the stripe colored resin, it is possible to prevent a mixed color area from being produced in a process of changing from the old color to the next color, whereby a color change loss (color failure of an electric wire) can be prevented from occurring.

In order to attain the object, the crosshead of an eighth aspect of the invention is configured so that, when the supplies of the colored resins from the stripe sub extruders are stopped, resins remaining in the sub-extruder supply paths elongating from the stripe sub extruders to the switch cocks are discharged to the outside through the resin discharge paths, by extruding the colored resins of a new color supplied from the stripe sub extruders, and resins remaining in the insert mold supply paths elongating from the switch cocks to the insert molds are discharged by a pressure of the ground color resin extruded from the ground color main extruder into the crosshead body, to the outside through the discharge paths of the switch cocks.

According to the eighth aspect of the invention configured as described above, during an operation of changing the color of the stripe colored resin, it is possible to prevent a mixed color area from being produced in a process of changing from the old color to the next color, whereby a color change loss (color failure of an electric wire) can be prevented from occurring.

DETAILED DESCRIPTION OF PREFERRED EMBODIMENTS

Hereinafter, embodiments of the crosshead of the invention will be described.

Figure 1:
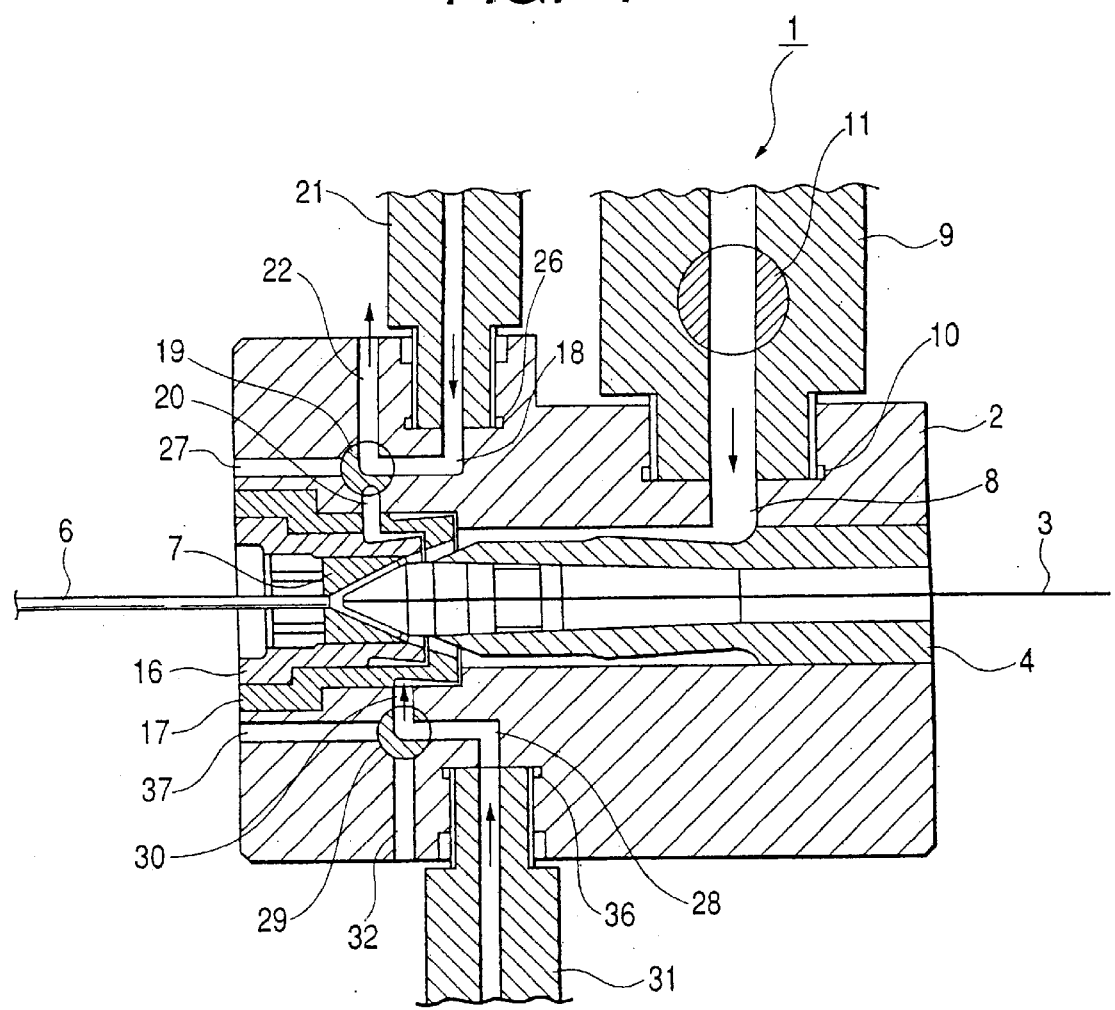
FIG. 1 is a section view showing a first embodiment of the crosshead of the invention.

FIG. 1 is a section view showing a first embodiment of the crosshead of the invention.

Referring to FIG. 1, a cylindrical nipple 4 in which the tip end is tapered and a strand conductor 3 runs through the center is fitted into the crosshead body 2 of a crosshead 1 formed into a cylindrical shape, so as to maintain a predetermined gap between the nipple and the inner face of the crosshead body 2. Two insert molds 16 and 17 which are formed into a cylindrical shape are overlappingly fittingly attached to the tip end portion of the crosshead body 2. A hole through which a covered wire 6 in which the strand conductor 3 is covered with a resin is to run is formed in the center of the insert mold 16. A die 7 which is tapered toward the center is fixedly attached to the mold. The die 7 and the nipple 4 are placed at the same center.

A ground color resin supply path 8 is opened in the crosshead body 2. A ground color main extruder 9 is attached to the body so as to communicate with the ground color resin supply path 8. A ground color resin is supplied from the ground color main extruder 9 into the crosshead body 2 via the ground color resin supply path 8. The reference numeral 10 denotes a seal for attaching the ground color main extruder 9 to the crosshead body 2, and 11 denotes a switch cock for, when the color of the ground color resin from the ground color main extruder 9 is to be changed, stopping the supply of the resin therefrom.

A sub-extruder supply path 18 which is formed into an L-like shape and which serves as a path for supplying a stripe colored resin is formed in the crosshead body 2. A switch cock 19 is disposed at the tip end of the sub-extruder supply path 18. An insert mold supply path 20 for supplying the colored resin which has been supplied to the switch cock 19, from the switch cock 19 to the insert mold 16 is disposed in the crosshead body 2. A stripe sub extruder 21 is attached to the body so as to communicate with the sub-extruder supply path 18. The stripe colored resin supplied from the stripe sub extruder 21 is passed through the sub-extruder supply path 18, then passed through the insert mold supply path 20 via the switch cock 19 to be supplied to the insert mold 16, and then supplied into the crosshead body 2 from the insert mold 16.

A resin discharge path 22 which elongates from the switch cock 19 to be opened to the outside is disposed in the crosshead body 2.

Figure 2A:
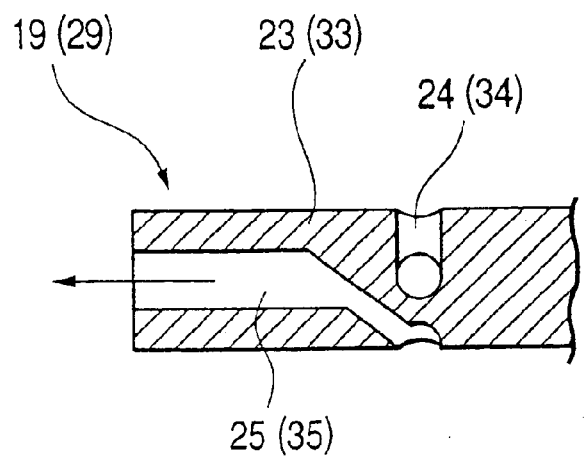
FIG. 2A is a transverse section view of a switch cock shown in FIG. 1.
Figure 2B:
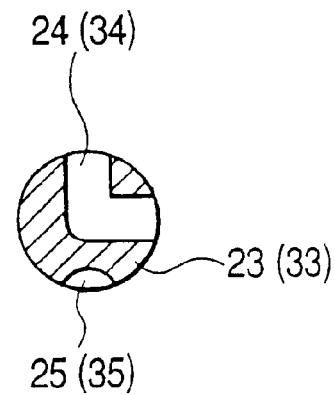
FIG. 2B is a longitudinal section view of the switch cock shown in FIG. 1.

The switch cock 19 has the configuration shown in FIG. 2. As shown in FIG. 2A, the switch cock 19 has the body 23 which is formed into a columnar shape, and a resin path 24 which radiately communicates with the center of the body 23 is formed in the body 23. As shown in FIG. 2B, the resin path 24 is formed so as to be bent at the center axis by about 90°. A discharge path 25 is formed in the body 23. The discharge path elongates from the outer peripheral face of the body 23 corresponding to the position where the resin path 24 is formed, toward the center axis and so as not to communicate with the resin path 24, and then advances in the axial length at the center. The discharge path is opened in an end portion of the body 23.

As shown in FIG. 1, when the switch cock 19 is rotated to a position where the supply of the colored resin from the stripe sub extruder 21 is stopped, therefore, the sub-extruder supply path 18 is caused to communicate with the resin discharge path 22 via the resin path 24, and the insert mold supply path 20 is caused to communicate with the discharge path 25.

The reference numeral 26 denotes a seal for attaching the stripe sub extruder 21 to the crosshead body 2, and 27 denotes a hole for forming the sub-extruder supply path 18.

A sub-extruder supply path 28 which is formed in a position opposed to the sub-extruder supply path 18 and into an L-like shape, and which serves as a path for supplying the stripe colored resin is formed in the crosshead body 2. A switch cock 29 is disposed at the tip end of the sub-extruder supply path 28. An insert mold supply path 30 for supplying the colored resin which has been supplied to the switch cock 29, from the switch cock 29 to the insert mold 17 is disposed in the crosshead body 2. A stripe sub extruder 31 is attached to the body so as to communicate with the sub-extruder supply path 28. The stripe colored resin supplied from the stripe sub extruder 31 is passed through the sub-extruder supply path 28, then passed through the insert mold supply path 30 via the switch cock 29 to be supplied to the insert mold 17, and then supplied into the crosshead body 2 from the insert mold 17. Therefore, the stripe sub extruder 21 and the stripe sub extruder 31 are disposed in symmetrical positions, i.e., positions which are separated from each other by 180°, respectively.

In the embodiment, the stripe sub extruder 21 and the stripe sub extruder 31 are placed in symmetrical positions (positions which are separated from each other by 180°), respectively. The positional relationship between the stripe sub extruder 21 and the stripe sub extruder 31 is not required to that in which the extruders are placed in symmetrical positions. The stripe sub extruder 21 and the stripe sub extruder 31 may be placed at positions which are separated from each other by any predetermined angle (for example, 90°, 60°, or 45°), as far as the conditions that the extruders can be placed are satisfied.

A resin discharge path 32 which elongates from the switch cock 29 to be opened to the outside is disposed in the crosshead body 2.

The switch cock 29 has the configuration shown in FIG. 2. As shown in FIG. 2A, the switch cock 29 has the body 33 which is formed into a columnar shape, and a resin path 34 which radiately communicates with the center of the body 33 is formed in the body 33. As shown in FIG. 2B, the resin path 34 is formed so as to be bent at the center axis by about 90°. A discharge path 35 is formed in the body 33. The discharge path elongates from the outer peripheral face of the body 33 corresponding to the position where the resin path 34 is formed, toward the center axis and so as not to communicate with the resin path 34, and then advances in the axial length at the center. The discharge path is opened in an end portion of the body 33.

As shown in FIG. 1, when the switch cock 29 is rotated to a position where the colored resin from the stripe sub extruder 31 is supplied, therefore, the sub-extruder supply path 28 is caused to communicate with the insert mold supply path 30 via the resin path 34, and the discharge path 35 does not communicate with any path.

FIG. 1 shows a state where the colored resin from the stripe sub extruder 31 is supplied and the stripe sub extruder 21 is preparing for the next color.

The reference numeral 36 denotes a seal for attaching the stripe sub extruder 31 to the crosshead body 2, and 37 denotes a hole for forming the sub-extruder supply path 28.

A stripe electric wire is produced by using the thus configured crosshead 1 in the following manner. The ground color resin supplied from the ground color main extruder 9 is sent via the ground color resin supply path 8 to the tip end of the nipple 4 with passing through the gap between the inner peripheral face of the crosshead body 2 and the outer peripheral face of the nipple 4. The surface of the strand conductor 3 is covered with the resin at a predetermined thickness by means of the tapered tip end portion of the crosshead body 2 and the tapered portion of the die 7. When, in the formation of a stripe in the ground color resin covering the surface of the strand conductor 3, the colored resin for forming a stripe and supplied from the stripe sub extruder 21 is to be changed to a resin of another color, the switch cock 19 is rotated to stop the supply of the colored resin supplied from the stripe sub extruder 21, and at the same time the switch cock 29 is rotated to be opened and the stripe sub extruder 31 which has been already prepared for the next color is driven to start the supply of the resin of the next color from the stripe sub extruder 31.

When the switch cock 19 is rotated to stop the supply of the colored resin from the stripe sub extruder 21, the sub-extruder supply path 18 is caused to communicate with the resin discharge path 22 via the resin path 24, and at the same time the insert mold supply path 20 is caused to communicate with the discharge path 25.

When connections are performed as described above, the stripe sub extruder 21 is prepared for the colored resin of the next color, and the resin extrusion is further performed. Then, the colored resin remaining in the range from the stripe sub extruder 21 to the sub-extruder supply path 18 is passed through the sub-extruder supply path 18 and the resin discharge path 22 via the resin path 24 to be discharged to the outside. The stripe sub extruder 21 continues the resin supply until the color of the colored resin discharged through the resin discharge path 22 is changed from the old color to the newly set color, and stops the resin supply at the timing when the color of the colored resin discharged through the resin discharge path 22 is changed from the old color to the newly set color. As a result, a state where the sub-extruder supply path 18 is filled with the new color resin is attained.

On the other hand, the insert mold supply path 20 communicates with the discharge path 25 to be in a state where the path is opened to the outside. After switching to the stripe sub extruder 31, therefore, the ground color resin is supplied from the ground color main extruder 9 to the insert mold supply path 20 which is opened in the interior of the crosshead body 2, and the interior of the crosshead body 2 is in the pressurized state. Consequently, the ground color resin reversely flows via the insert mold 16 to cause the colored resin of the old color remaining in the insert mold supply path 20 to be discharged to the outside through the discharge path 25. As a result, the insert mold supply path 20 is filled with the ground color resin.

When the supply resin is switched from the stripe sub extruder 21 to the stripe sub extruder 31, therefore, the sub-extruder supply path 18 communicates with the insert mold supply path 20 via the resin path 24 of the switch cock 19. Consequently, the colored resin of the new color supplied from the stripe sub extruder 21 pushes the new color resin filling the sub-extruder supply path 18, and first pushes the ground color resin filling the insert mold supply path 20, into the crosshead body 2. When the ground color resin filling the insert mold supply path 20 is completely pushed out therefrom, the colored resin of the new color is pushed out.

Figure 3:
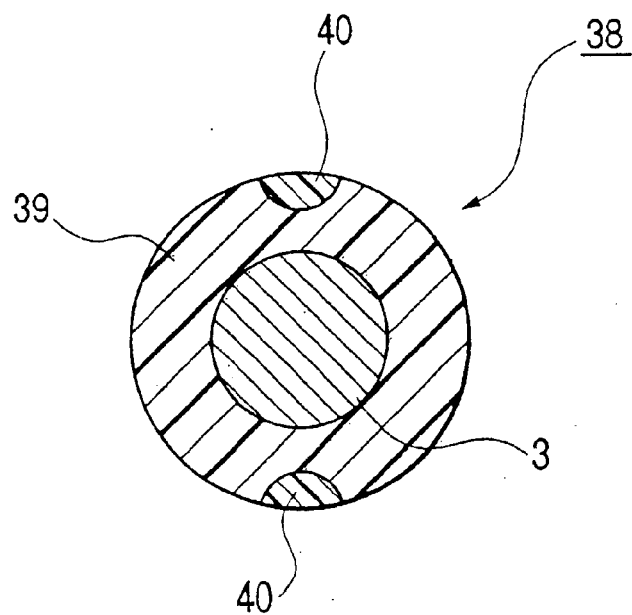
FIG. 3 is a section view of a stripe electric wire which is produced by using the crosshead shown in FIG. 1.

FIG. 3 shows the stripe electric wire which is produced as described above. In the stripe electric wire 38, the strand conductor 3 is covered with the ground color resin 39, and the stripe resin 40 is formed at symmetric positions of the outer peripheral face of the ground color resin 39.

Figure 4:
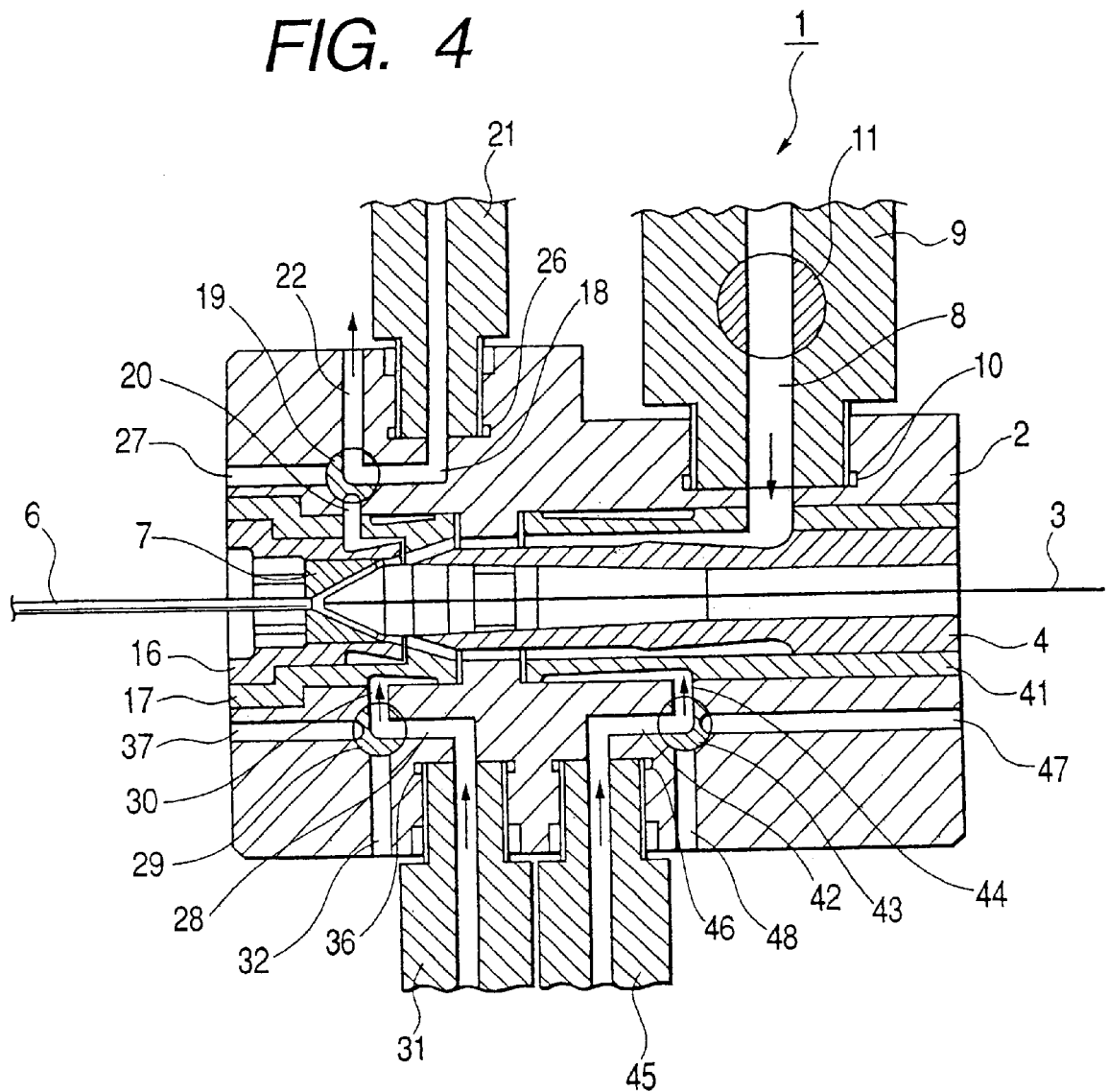
FIG. 4 is a section view showing a second embodiment of the crosshead of the invention.

FIG. 4 is a section view showing a second embodiment of the crosshead of the invention.

In FIG. 4, components which are identical with those of the crosshead 1 of FIG. 1 are denoted by the same reference numerals.

The second embodiment of FIG. 4 is different from the first embodiment of FIG. 1 in that a skin layer sub extruder for forming a skin layer is disposed in the crosshead body 2. The skin layer is used in the following manner. The ground color is configured by a two-layer structure, and only the outer layer (skin layer) is colored.

An insert mold 41 which is formed into a cylindrical shape is fittingly attached to the interior of the rear end side of the crosshead body 2. The nipple 4 is fittingly attached into the insert mold 41.

A sub-extruder supply path 42 which is formed into an L-like shape and which serves as a path for supplying a colored resin for forming the skin layer is formed in the crosshead body 2. A switch cock 43 is disposed at the tip end of the sub-extruder supply path 42. An insert mold supply path 44 for supplying the colored resin which has been supplied to the switch cock 43, from the switch cock 43 to the insert mold 41 is disposed in the crosshead body 2. A skin layer sub extruder 45 is attached to the body so as to communicate with the sub-extruder supply path 42. The skin layer colored resin supplied from the skin layer sub extruder 45 is passed through the sub-extruder supply path 42, then passed through the insert mold supply path 44 via the switch cock 43 to be supplied to the insert mold 41, and then supplied into the crosshead body 2 from the insert mold 41.

The reference numeral 46 denotes a seal for attaching the skin layer sub extruder 45 to the crosshead body 2, and 47 denotes a hole for forming the sub-extruder supply path 42.

A resin discharge path 48 which elongates from the switch cock 43 to be opened to the outside is disposed in the crosshead body 2.

The switch cock 43 is configured in the same manner as the switch cock 19 (26) shown in FIG. 2.

FIG. 4 shows a state where the colored resin for forming the skin layer is supplied from the skin layer sub extruder 45. When the switch cock 43 is set to the position shown in FIG. 4, the sub-extruder supply path 42 and the insert mold supply path 44 are caused to communicate with each other via the resin path 24.

Figure 5A:
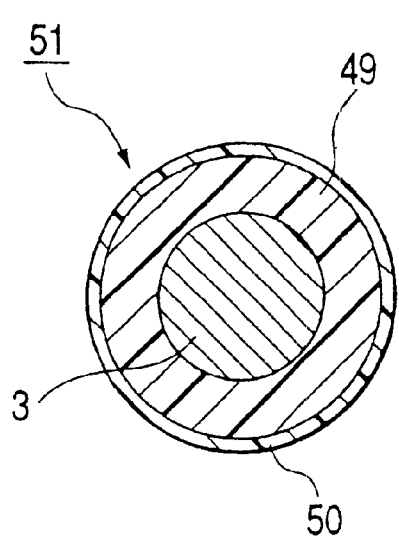
FIG. 5 is a section view of a stripe electric wire which is produced by using the crosshead shown in FIG. 4.
Figure 5B:
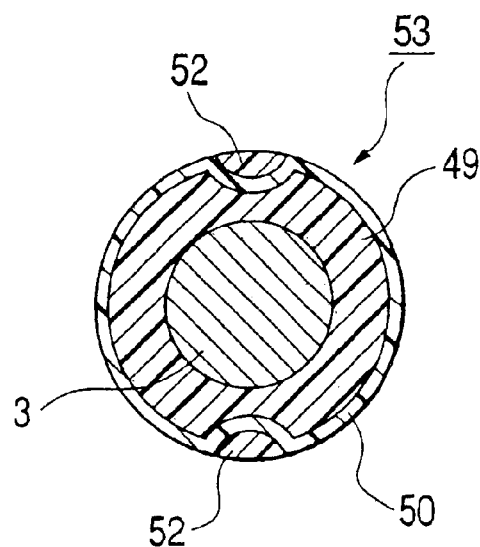

A stripe electric wire is produced by using the thus configured crosshead in the following manner. The ground color resin supplied from the ground color main extruder 9 is sent via the ground color resin supply path 8 to the tip end of the nipple 4 with passing through the gap between the inner peripheral face of the crosshead body 2 and the outer peripheral face of the nipple 4. The surface of the strand conductor 3 is covered with an inner layer resin 49 at a predetermined thickness by means of the tapered tip end portion of the crosshead body 2 and the tapered portion of the die 7. The colored resin for forming a skin layer 50 and supplied from the skin layer sub extruder 45 is extruded onto the inner layer resin 49, thereby forming a covered electric wire 1 shown in FIG. 5A. At the same time as the extrusion formation of the skin layer 50, covering by the colored resin for forming a stripe and supplied from the stripe sub extruder 31 is conducted to form a stripe 52 as shown in FIG. 5B, thereby forming a stripe electric wire 53.

Figure 6:
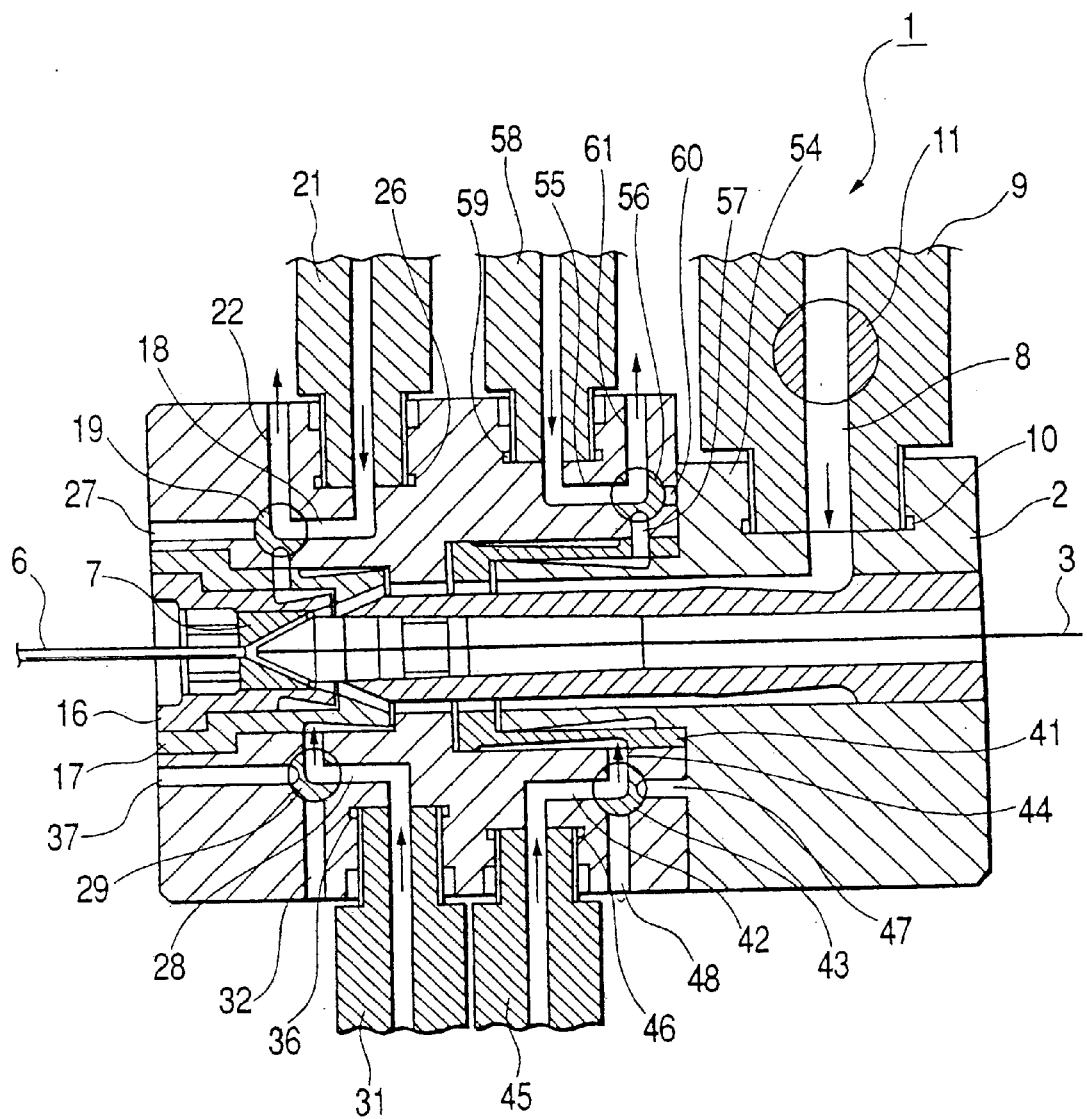
FIG. 6 is a section view showing a third embodiment of the crosshead of the invention.
Figure 7:
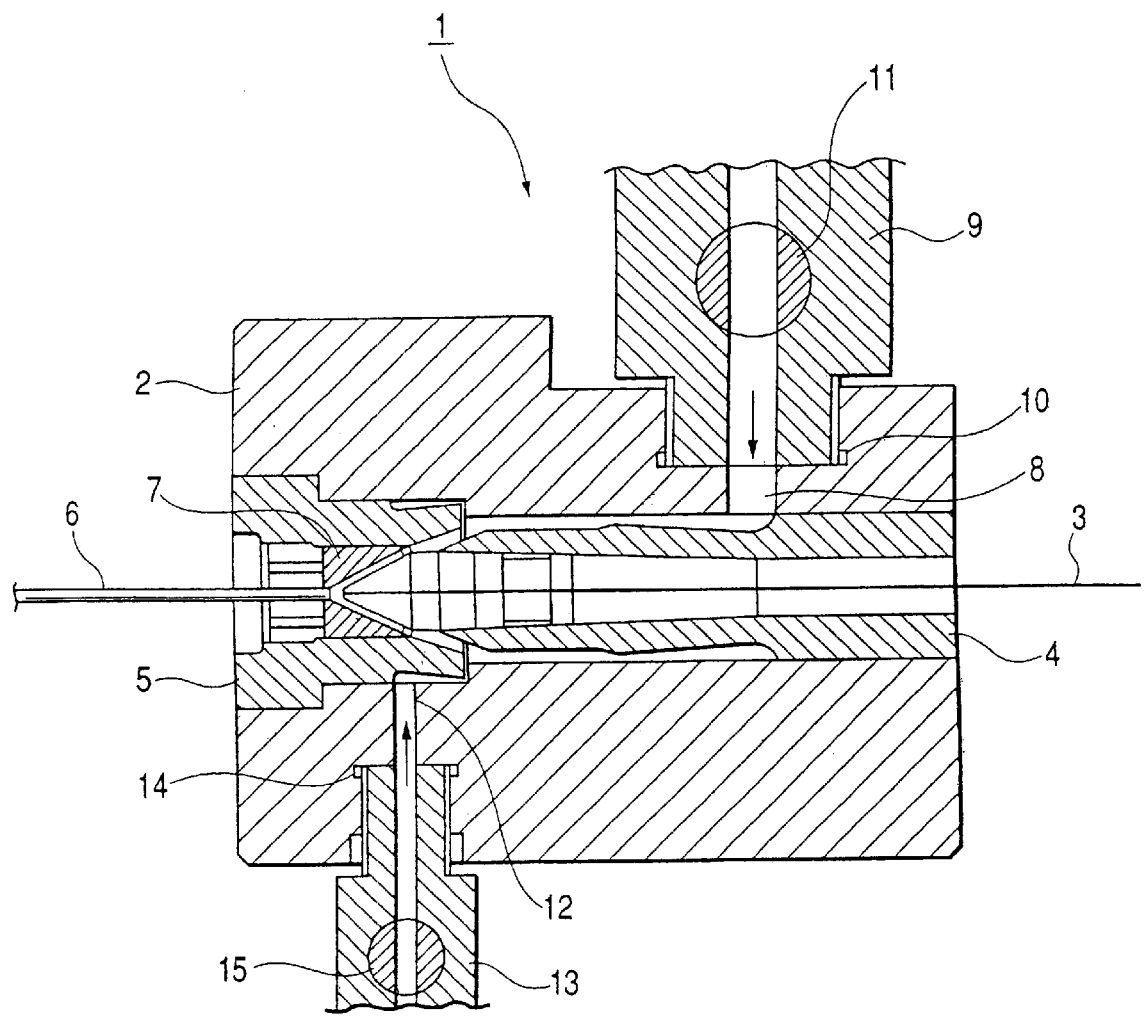
FIG. 7 is a section view showing a crosshead of the conventional art.

FIG. 6 is a section view showing a third embodiment of the crosshead of the invention.

In FIG. 6, components which are identical with those of the crosshead 1 of FIG. 4 are denoted by the same reference numerals.

The third embodiment of FIG. 6 is different from the second embodiment of FIG. 4 in that a skin layer sub extruder for forming a skin layer is disposed in the crosshead body 2. In the interior of the rear end side of the crosshead body 2, an insert mold 54 is fittingly attached in a stacked manner to the inside of the insert mold 41 which is formed into a cylindrical shape, so as to constitute a double structure. The nipple 4 is fittingly attached into the insert mold 54.

A sub-extruder supply path 55 which is formed into an L-like shape and which serves as a path for supplying a colored resin for forming the skin layer is formed in the crosshead body 2. A switch cock 56 is disposed at the tip end of the sub-extruder supply path 55. An insert mold supply path 57 for supplying the colored resin which has been supplied to the switch cock 56, from the switch cock 56 to the insert mold 54 is disposed in the crosshead body 2. A skin layer sub extruder 58 is attached to the body so as to communicate with the sub-extruder supply path 55. The skin layer colored resin supplied from the skin layer sub extruder 58 is passed through the sub-extruder supply path 55, then passed through the insert mold supply path 57 via the switch cock 56 to be supplied to the insert mold 54, and then supplied into the crosshead body 2 from the insert mold 54.

The reference numeral 59 denotes a seal for attaching the skin layer sub extruder 58 to the crosshead body 2, and 60 denotes a hole for forming the sub-extruder supply path 55.

A resin discharge path 61 which elongates from the switch cock 56 to be opened to the outside is disposed in the crosshead body 2.

As shown in FIG. 6, when the switch cock 43 is rotated to a position where the skin layer colored resin supplied from the skin layer sub extruder 45 is supplied, therefore, the sub-extruder supply path 42 and the insert mold supply path 44 are caused to communicate with each other via the resin path 34, and the discharge path 35 of the switch cock 43 does not communicate with any path.

FIG. 6 shows a state where the skin layer colored resin is supplied from the skin layer sub extruder 45 and the skin layer sub extruder 58 is preparing for a colored resin of the next color for the skin layer.

A stripe electric wire is produced by using the thus configured crosshead 1 in the following manner. The ground color resin supplied from the ground color main extruder 9 is sent via the ground color resin supply path 8 to the tip end of the nipple 4 with passing through the gap between the inner peripheral face of the crosshead body 2 and the outer peripheral face of the nipple 4. The surface of the strand conductor 3 is covered with the resin at a predetermined thickness by means of the tapered tip end portion of the crosshead body 2 and the tapered portion of the die 7. When, in the formation of the skin layer on the inner layer resin covering the surface of the strand conductor 3, the colored resin for forming the skin layer and supplied from the skin layer sub extruder 58 is to be changed to a resin of another color, the switch cock 56 is rotated to stop the supply of the colored resin for forming the skin layer and supplied from the stripe sub extruder 58, and at the same time the switch cock 42 is rotated to be opened and the skin layer sub extruder 45 which has been already prepared for the next color is driven to start the supply of the colored resin of the next color from the skin layer sub extruder 45.

When the switch cock 56 is rotated to stop the supply of the skin layer colored resin from the skin layer sub extruder 58, the sub-extruder supply path 55 is caused to communicate with the resin discharge path 61 via the resin path 24, and at the same time the insert mold supply path 54 is caused to communicate with the discharge path 25 of the switch cock 56.

When the skin layer sub extruder 58 is prepared for the colored resin of the next color and the resin extrusion is further performed, the skin layer colored resin remaining in the range from the skin layer sub extruder 58 to the sub-extruder supply path 55 is passed through the sub-extruder supply path 55 and the resin discharge path 61 via the resin path 24 of the switch cock 56 to be discharged to the outside. The skin layer sub extruder 58 continues the resin supply until the color of the colored resin discharged through the resin discharge path 61 is changed from the old color to the newly set color, and stops the resin supply through the sub-extruder supply path 55 at the timing when the color of the colored resin discharged through the resin discharge path 61 is changed from the old color to the newly set color. As a result, a state where the skin layer sub extruder 58 is filled with the new color resin is attained.

On the other hand, the insert mold supply path 57 communicates with the discharge path 25 of the switch cock 56 to be in a state where the path is opened to the outside. After switching to the skin layer sub extruder 45, therefore, the ground color resin is supplied from the ground color main extruder 9 to the insert mold supply path 57 which is opened in the interior of the crosshead body 2, and the interior of the crosshead body 2 is in the pressurized state. Consequently, the ground color resin reversely flows via the insert mold 64 to cause the skin layer colored resin of the old color remaining in the insert mold supply path 57 to be discharged to the outside through the discharge path 25 of the switch cock 56. As a result, the insert mold supply path 57 is filled with the ground color resin.

When the supply resin for the skin layer is switched from the skin layer sub extruder 45 to the skin layer sub extruder 58, therefore, the sub-extruder supply path 57 communicates with the insert mold supply path 55 via the resin path 24 of the switch cock 56. Consequently, the skin layer colored resin of the new color supplied from the skin layer sub extruder 58 pushes the new color resin filling the sub-extruder supply path 55, and first pushes the ground color resin filling the insert mold supply path 55, into the crosshead body 2. When the ground color resin filling the insert mold supply path 55 is completely pushed out therefrom, the skin color colored resin of the new color is pushed out.

In the crosshead 1, the switch cocks 43 and 56 are operated in the following manner. When the colored resins are to be supplied from the skin layer sub extruders 45 and 58 to the insert molds 41 and 54, the sub-extruder supply paths 42 and 55 through which the colored resins from the skin layer sub extruders 45 and 58 are supplied are caused to communicate with the insert mold supply paths 44 and 57 through which the colored resins are supplied to the insert molds 41 and 54, respectively. When the supplies of the colored resins from the skin layer sub extruders 45 and 58 are to be stopped, the sub-extruder supply paths 42 and 55 through which the colored resins from the skin layer sub extruders 45 and 58 are supplied are caused to communicate with the resin discharge paths 48 and 61, and the insert mold supply paths 44 and 57 are caused to communicate with the resin discharge paths 48 and 61, respectively.

According to this configuration, during an operation of changing the color of the skin layer colored resin, a mixed color area can be prevented from being produced in a process of changing from the old color to the next color, whereby a color change loss (color failure of an electric wire) can be prevented from occurring.

In the crosshead 1, when the supplies of the colored resins from the skin layer sub extruders 45 and 58 are stopped, the resins remaining in the sub-extruder supply paths 42 and 55 elongating from the skin layer sub extruders 45 and 58 to the switch cocks 43 and 56 are discharged to the outside through the resin discharge paths 48 and 61, by extruding the colored resins of the new color supplied from the skin layer sub extruders 45 and 58, and the resins remaining in the insert mold supply paths 44 and 57 elongating from the switch cocks 43 and 56 to the insert molds 41 and 54 are discharged by the pressure of the ground color resin extruded from the ground color main extruder 9 into the crosshead body 2, to the outside through the resin discharge paths 48 and 61 of the switch cocks 43 and 56.

According to this configuration, during an operation of changing the color of the skin layer colored resin, a mixed color area can be prevented from being produced in a process of changing from the old color to the next color, whereby a color change loss (color failure of an electric wire) can be prevented from occurring.

As described above, when the color of the skin layer formed on the ground color resin is to be changed, the switch cock 43 and the switch cock 56 are switched so that the operations of the skin layer sub extruder 45 and the skin layer sub extruder 58 are switched, whereby the changing can be easily realized in the same manner as the case where the stripe sub extruder 21 and the stripe sub extruder 31 are switched.

According to the first aspect of the invention, a mixed color area can be prevented from being produced in a process of changing from the old color to the next color, and a color change loss (color failure of an electric wire) can be prevented from occurring.

According to the second aspect of the invention, the resin pressure in the crosshead can be uniformalized, and a stripe electric wire in which the stripe is positioned in balance can be produced.

According to the third aspect of the invention, an inner layer resin can be thinly covered with a resin of a preferred color so that the ground color of the covered electric wire can be freely changed without being affected by the color of the inner layer resin.

According to the fourth aspect of the invention, during an operation of changing the color of the stripe colored resin, it is possible to prevent a mixed color area from being produced in a process of changing from the old color to the next color, whereby a color change loss (color failure of an electric wire) can be prevented from occurring.

According to the fifth aspect of the invention, during an operation of changing the color of the colored resin for the skin layer, the colored resin of the old color which remains in the range from the skin layer sub extruder to the switch cock can be surely discharged to the outside, and hence it is possible to prevent a mixed color area from being produced in a process of changing from the old color to the next color, whereby a color change loss (color failure of an electric wire) can be prevented from occurring.

According to the sixth aspect of the invention, during an operation of changing the color of the stripe colored resin, it is possible to prevent a mixed color area from being produced in a process of changing from the old color to the next color, whereby a color change loss (color failure of an electric wire) can be prevented from occurring.

According to the seventh aspect of the invention, during an operation of changing the color of the stripe colored resin, it is possible to prevent a mixed color area from being produced in a process of changing from the old color to the next color, whereby a color change loss (color failure of an electric wire) can be prevented from occurring.

According to the eighth aspect of the invention, during an operation of changing the color of the stripe colored resin, it is possible to prevent a mixed color area from being produced in a process of changing from the old color to the next color, whereby a color change loss (color failure of an electric wire) can be prevented from occurring.

What is claimed is:

1. A crosshead comprising:
   a ground color main extruder supplying a colored resin through a main path to cover a strand conductor;
   a plurality of stripe sub extruders supplying a colored resin in a stripe-like manner in a longitudinal direction of the strand conductor simultaneously with extrusion of the ground color resin;
   insert molds disposed in the crosshead, wherein while alternatingly switching over said stripe sub extruders each time when a colored resin to be supplied is changed, a colored resin of a predetermined color is supplied through a separate supply path which is disposed for each of said stripe sub extruders to the main path.

2. A crosshead according to claim 1, wherein said stripes are formed on an outer periphery of a covered wire in such a manner that the positions of at least two of them are symmetrical with respect to an axis of said strand conductor, each of said stripe sub extruders disposed adjacently from each other is separated by a predetermined angle for each of said stripe sub extruders.

3. A crosshead according to claim 1, further comprising:
   a skin layer sub extruder forming a skin layer on a covered wire covered with an inner layer resin by said ground color main extruder; and
   a skin layer insert mold, disposed at said crosshead, for forming the skin layer.

4. A crosshead according to claim 2, further comprising:
   a skin layer sub extruder forming a skin layer on a covered wire covered with an inner layer resin by said ground color main extruder; and
   a skin layer insert mold, disposed at said crosshead, for forming the skin layer.

5. A crosshead according to claim 1, further comprising:
   switch cocks allowing and stopping the supplies of the colored resins from said sub stripe extruders to said insert molds, said switch cocks respectively disposed in middles of said supply paths through which the colored resins of said stripe sub extruders are supplied to said insert molds;
   resin discharge paths respectively elongating from positions where said switch cocks are attached, and which are opened to a location external to the crosshead.

6. A crosshead according to claim 2, further comprising:
   switch cocks allowing and stopping the supplies of the colored resins from said sub stripe extruders to said insert molds, said switch cocks respectively disposed in middles of said supply paths through which the colored resins of said stripe sub extruders are supplied to said insert molds;
   resin discharge paths respectively elongating from positions where said switch cocks are attached, and which are opened to a location external to the crosshead.

7. A crosshead according to claim 3, further comprising:
   a switch cock allowing and stopping the supplies of the colored resins from said skin layer sub extruder to said skin layer insert mold, said switch cock respectively disposed in a middle of a supply path through which the colored resins of said skin layer sub extruder is supplied to said insert mold;
   a resin discharge path respectively elongating from a position where said switch cock is attached, and which is opened to a location external to said crosshead.

8. A crosshead according to claim 4, further comprising:
   a switch cock allowing and stopping the supplies of the colored resins from said skin layer sub extruder to said skin layer insert mold, said switch cock respectively disposed in a middle of a supply path through which the colored resins of said skin layer sub extruder is supplied to said insert mold;
   a resin discharge path respectively elongating from a position where said switch cock is attached, and which is opened to a location external to said crosshead.

9. A crosshead according to claim 5, wherein each of said switch cocks is formed into a columnar shape, and said switch cock has a resin path communicating with a center of said switch cock and a discharge path elongating from a position where said resin path is formed, toward a center axis and so as not to communicate with said resin path, and said discharge path opened in an end portion.

10. A crosshead according to claim 6, wherein each of said switch cocks is formed into a columnar shape, and said switch cock has a resin path communicating with a center of said switch cock and a discharge path elongating from a position where said resin path is formed, toward a center axis and so as not to communicate with said resin path, and said discharge path opened in an end portion.

11. A crosshead according to claim 7, wherein said switch cock is formed into a columnar shape, and said switch cock has a resin path communicating with a center of said switch cock and a discharge path elongating from a position where said resin path is formed, toward a center axis and so as not to communicate with said resin path, and said discharge path opened in an end portion.

12. A crosshead according to claim 8, wherein said switch cock is formed into a columnar shape, and said switch cock has a resin path communicating with a center of said switch cock and a discharge path elongating from a position where said resin path is formed, toward a center axis and so as not to communicate with said resin path, and said discharge path opened in an end portion.

13. A crosshead according to claim 5, wherein, when the colored resins are to be supplied from said stripe sub extruders to said insert molds, said switch cocks cause sub-extruder supply paths through which the colored resins from said stripe sub extruders are supplied, to communicate with insert mold supply paths through which the colored resins are supplied to said insert molds, and, when the supplies of the colored resins from said stripe sub extruders are to be stopped, cause said sub-extruder supply paths through which the colored resins from said stripe extruders are supplied, to communicate with said resin discharge paths, and said insert mold supply paths to communicate with said discharge paths.

14. A crosshead according to claim 6, wherein, when the colored resins are to be supplied from said stripe sub extruders to said insert molds, said switch cocks cause sub-extruder supply paths through which the colored resins from said stripe sub extruders are supplied, to communicate with insert mold supply paths through which the colored resins are supplied to said insert molds, and, when the supplies of the colored resins from said stripe sub extruders are to be stopped, cause said sub-extruder supply paths through which the colored resins from said stripe extruders are supplied, to communicate with said resin discharge paths, and said insert mold supply paths to communicate with said discharge paths.

15. A crosshead according to claim 13, wherein, when the supplies of the colored resins from said stripe sub extruders are stopped, resins remaining in said sub-extruder supply paths elongating from said stripe sub extruders to said switch cocks are discharged through said resin discharge paths, by extruding the colored resins of a new color supplied from said stripe sub extruders, and resins remaining in said insert mold supply paths elongating from said switch cocks to said insert molds are discharged by a pressure of the ground color resin extruded from said ground color main extruder into said crosshead, to a location external to said crosshead through discharge paths of said switch cocks.

16. A crosshead according to claim 14, wherein, when the supplies of the colored resins from said stripe sub extruders are stopped, resins remaining in said sub-extruder supply paths elongating from said stripe sub extruders to said switch cocks are discharged through said resin discharge paths, by extruding the colored resins of a new color supplied from said stripe sub extruders, and resins remaining in said insert mold supply paths elongating from said switch cocks to said insert molds are discharged by a pressure of the ground color resin extruded from said ground color main extruder into said crosshead, to a location external to said crosshead through discharge paths of said switch cocks.

* * * * *